United States Patent

Stevens et al.

[11] Patent Number: 6,086,928
[45] Date of Patent: Jul. 11, 2000

[54] WHITENED FOOD PRODUCTS AND PROCESS FOR PRODUCING THE SAME

[75] Inventors: John F. Stevens, Idaho Falls, Id.; Emmett L. Cook, Geneva; C. Lynn Theiss, Naperville, both of Ill.

[73] Assignee: Newly Weds Foods, Inc., Chicago, Ill.

[21] Appl. No.: 09/019,221

[22] Filed: Feb. 5, 1998

[51] Int. Cl.$^7$ .............................. A23L 1/216; A23L 1/275; A23L 1/314
[52] U.S. Cl. ........................... 426/92; 426/102; 426/250; 426/289; 426/302
[58] Field of Search ............................. 426/92, 102, 289, 426/302, 637, 644, 250, 615, 641, 261

[56] References Cited

U.S. PATENT DOCUMENTS

| | | | |
|---|---|---|---|
| 3,579,356 | 5/1971 | Miller et al. | |
| 3,597,227 | 8/1971 | Murray et al. | |
| 3,658,552 | 4/1972 | Carlson et al. | |
| 3,751,268 | 8/1973 | Van Patten et al. | |
| 4,176,200 | 11/1979 | Princen et al. | 426/250 |
| 4,187,326 | 2/1980 | Serafino et al. | 426/590 |
| 4,279,940 | 7/1981 | Wurzburg et al. | 426/590 |
| 4,349,577 | 9/1982 | Tessler | 426/590 |
| 4,479,971 | 10/1984 | Eng et al. | 426/330 |
| 4,508,744 | 4/1985 | Kruger, Jr. et al. | 426/590 |
| 4,529,606 | 7/1985 | Fustier et al. | 426/330.3 |
| 4,529,613 | 7/1985 | Mezzino et al. | 426/590 |
| 4,612,204 | 9/1986 | Huffman | 426/590 |
| 4,780,326 | 10/1988 | Stemmler et al. | 426/250 X |
| 4,853,235 | 8/1989 | Tomomatsu | 426/93 |
| 5,089,171 | 2/1992 | Chiu | 426/590 X |
| 5,194,284 | 3/1993 | Chiu et al. | 426/589 |
| 5,219,602 | 6/1993 | Saleeb et al. | 426/250 |
| 5,300,310 | 4/1994 | Elsen | 426/540 |
| 5,484,617 | 1/1996 | Tiffany | 426/250 |
| 5,614,243 | 3/1997 | Dunn et al. | 426/578 |

FOREIGN PATENT DOCUMENTS 2652722  4/1991  France ..................... 426/637

*Primary Examiner*—Arthur L. Corbin
*Attorney, Agent, or Firm*—Brinks Hofer Gilson & Lione; G. Peter Nichols

[57] ABSTRACT

A food product includes an edible base and an outer coating that contains a whitener such that the resulting food product has a white light color. The whitener includes titanium dioxide, white dye, or other substance that imparts a white color. A process for making the food product includes incorporating a whitener into the process by such means as addition of the whitener into a dry batter mix, addition of the whitener to the water used to hydrate the dry batter mix, passing the edible base through an aqueous solution of the whitener, addition of the whitener after a batter coating has been applied to the edible base, or a combination of the above.

23 Claims, No Drawings

WHITENED FOOD PRODUCTS AND PROCESS FOR PRODUCING THE SAME

BACKGROUND OF THE INVENTION

This invention relates to food products and processes for making food products having a brighter more white color. This invention is particularly useful for preparing frozen potato products such as french fry products.

French fried potatoes have long been popular as a convenience food, especially those that have been frozen. To enhance the appearance, texture, taste, and especially the holding time of such products, batter coatings have been applied to the potato.

Methods for preparing and applying batter coatings to the outer surfaces of potato products are known in the art. For example, U.S. Pat. No. 3,597,227 to Murray et al. discloses a process in which raw potato strips are coated in a hot aqueous solution of modified amylose, with the coated strips containing from about 0.002 to 0.02 percent by weight of amylose. Prior to coating the potatoes, the amylose solution is heated until all the amylose has been gelatinized. This process is reported to produce a finished product which has superior strength and rigidity, yet is not objectionably tough. The finished product also purportedly has a reduced oil content.

Similarly, U.S. Pat. No. 3,751,268 to Van Patten et al. discloses a coating of blanched potato pieces with 0.1 to 1.5 percent by weight of an ungelatinized unmodified high amylose starch having an amylose content of at least 50 percent. The coated potato strips are deep fat fried. Among other things, deep frying gelatinizes the starch in the coating. The finished product reportedly has less oil and improved texture.

U.S. Pat. No. 5,059,435 to Sloan et al. discloses yet another method of preparing batter coated and frozen potato products wherein the potatoes are coated with an aqueous starch slurry comprised of a modified ungelatinized potato starch, modified ungelatinized corn starch, rice flour, and other optional ingredients. The starch coating is reported to enhance the holding quality of the final product. It also purportedly improves the acceptability of the finished product by increasing the crispiness of the outer surface, and helps to maintain the tenderness of the interior of the cut potato.

In addition to batter coating, various methods have been proposed for preparing frozen potato products so that they have a pleasing appearance which has been generally identified by the industry as a light white to golden brown finished color. One such method for preparing potato pieces is disclosed in U.S. Pat. No. 4,542,030 to Haury et al. where, after the potato has been blanched, it is immersed in a combination of sodium acid pyrophosphate (SAPP) and caramel. This allows the pieces to develop a golden color through a combination of caramel coloring and caramelization of the sugar content.

U.S. Pat. No. 5,484,617 to Tiffany discloses a process where the potato pieces are passed through an aqueous solution of food grade color, i.e. annatto or yellow dye, which is said to provide the potato pieces with a light golden yellow color upon emerging from the color solution and is retained through the final preparation for consumption.

Although batter coatings and modified processes have done much to improve the appearance, increase the holding time of these potato products under a heat lamp, and produce crispier product textures and new tastes, the resulting products still tend to be darker in color than if no batter coating were applied at all. This is a major concern to food service clients that desire the holding time extension with crispier textures and new flavors, but do not want a darker brown colored product.

Compounding the problem of darker brown color resulting from batter coatings is that during the potato processing year and from one potato processing season to another, the inherent raw potato reducing sugar changes. The raw potato reducing sugars create a darker colored potato product when the potato is subjected to the elevated heat of parfrying and finish frying or baking. Leaching of these reducing sugars is required by processors through a process called water and/or steam blanching (cooking), causing the texture to become soft and less crisp.

Additionally, new batter coated frozen potato products on the market called "clear coats" by the industry are sought after because the coating is near invisible to the eye, but the heat lamp retention time is much longer than that of an uncoated fry. Because of inherent raw potato reducing sugar, processors have been known to specifically set aside bins of raw potato having very low reducing sugar in order to be able to manufacture these clear coat products and to have the desired light golden brown color in the finished potato product.

Nevertheless, there remains a need for an improved process for making these frozen coated products, especially clear coat potato products, that have a light golden brown color typical of the potato product when manufactured without the batter coating. Furthermore, there remains a need for an improved process for making these frozen batter coated potato products to have the same light golden brown color, regardless of fluctuation in inherent raw potato reducing sugar that occurs within a single potato processing year or from one potato processing year to the next.

SUMMARY OF THE INVENTION

The present invention relates to food products and to a process for preparing food products. The food product includes an edible base and a coating containing a quantity of a whitener sufficient to impart a white color to the edible base when a sufficient amount of coating is applied to the base.

As used in the specification and appended claims, the term edible base is intended to mean any edible food such as fish, chicken, vegetables, fruits, meats and the like. Although a wide variety of edible foods are contemplated within the scope of the present invention, it is believed that the present invention will be particularly useful for vegetables. For example, the present invention may find particular use with the following vegetables: potato, carrot, onion, turnip, rutabaga, celery, parsnip, red beet, eggplant, squash, vegetable marrow, cauliflower, broccoli, brussel sprout, mushroom and the like. Because it is believed that the present invention is particularly useful for potatoes and to simplify the description, the following specification will make reference to potatoes. One of skill in the art, however, will appreciate that the reference to potatoes does not limit the applicability of the present invention and that the present invention may be useful with other edible foods.

The present invention also includes a process for making the food product of the present invention. Generally, the process includes applying a coating to an edible base wherein the coating contains a quantity of a whitener sufficient to impart a white color to the base when a sufficient amount of coating is applied.

In both the product and the process, the whitener includes food grade whiteners such as calcium carbonate, calcium lactate, sodium or calcium caseinate, titanium dioxide, white dye, or other substances known to impart a white color. Preferably, the whitener is titanium dioxide. In this embodiment, where titanium dioxide is the whitener, the process and the resulting product are such that the titanium dioxide is present in an amount from about 0.0001% to about 1% by weight of the finished product, preferably from about 0.001% to about 0.5% by weight of the finished product. In a particularly preferred embodiment, the edible base is a potato and more preferably, is a potato piece.

Another aspect of the present invention includes a batter used for coating an edible base wherein the batter includes a quantity of whitener sufficient to impart a white color to edible base when the base is coated with a sufficient amount of batter. Preferably, the whitener is selected from the group consisting of titanium dioxide, white dye, and mixtures thereof. Typically, the batter will include an amount of whitener from about 0.0001% to about 10% by weight, preferably from about 0.001% to about 5% by weight of the batter.

DETAILED DESCRIPTION OF THE INVENTION

The food product of the present invention includes an edible base surrounded by a coating that contains a quantity of a whitener sufficient to impart a white color to the edible base when a sufficient amount of coating is applied to the edible base. The present invention also includes a process for making the food product as well as a batter containing a whitener, which batter can be used in the process.

Generally, the edible base can include any edible food item for which it may be desired to impart a whiter, lighter color. The edible base can include foods such as fish, chicken, meats, vegetables, fruits, and the like. A particularly preferred edible base is a potato, particularly potato pieces, which may include french fries.

The coating can be any edible substance or combination of edible substances capable of adhering to or enrobing the base. For example, the coating can be a powder, an aqueous flour or starch containing batter, an aqueous or non-aqueous liquid. In one embodiment, the coating may simply be water, or water containing SAPP, or water containing other known ingredients. In a preferred embodiment where the edible base is a potato piece, the coating is an aqueous batter that includes flours, starches, binders, and may optionally contain spices and flavors. Generally, this batter includes from about 35% to about 85% by weight water and from about 15% to about 65% solids. It will be understood by one of skill in the art that the term coating as used in the specification may be the same or different than batters that are sometimes used to coat edible food products.

The amount of coating present in the finished food product necessarily depends upon both the amount of whitener present in the coating as well as the amount of coating applied to the edible base. Generally, the finished food product contains an amount of coating from about 1% to about 90% by weight of the finished food product. Preferably, the finished food product contains an amount of coating from about 4% to about 70% by weight of the finished food product, more preferably from about 10% to about 60%.

Where the edible base is a potato piece, the finished food product contains from about 1% to about 10%, preferably, from about 10% to about 25% of the preferred coating.

As pointed out above, the coating contains a whitener. The whitener may include food grade whiteners such as calcium carbonate, calcium lactate, sodium or calcium caseinate, white dyes, those white opaque pigments or white extender pigments suitable for food use and known to those of skill in the art, as well as any other substance known to those of skill in the art to impart a white tint or color and are suitable for food use. Examples of white opaque pigments and white extender pigments are disclosed in the Kirk-Othmer Encyclopedia of Chemical technology, second ed., vol. 15, pp. 496–517, incorporated herein by reference. Where extender pigments are used such as calcium sulfate, calcium carbonate, china clays, bentonite and the like, it is preferred that they be combined with a white opaque pigment such as titanium dioxide. Combinations of pigments may be prepared by either mechanically mixing one or more pigments together or by causing the pigments to precipitate from solution or by other well known methods.

A preferred whitener is titanium dioxide in either rutile or anatase crystal form or a mixture thereof. Generally, it is preferred to use titanium dioxide as the sole whitener. In this regard, the titanium dioxides useful in the present invention are those that are edible and suitable for human consumption.

Titanium dioxide suitable for use in food products may be available in two forms, finely divided food grade titanium dioxide and pigmentary food grade titanium dioxide. The term "finely divided food grade titanium dioxide" as used herein is intended to mean and to refer to titanium dioxide particles in rutile or in anatase crystalline forms or in mixtures of these forms wherein the titanium dioxide is substantially free from impurities and is certified by a controlling food and drug authority and is suitable for food use. Such finely divided titanium dioxide is generally further characterized in that it is composed of particles having an average ultimate particle size between about 0.1 and 0.7 micron.

The term "pigmentary food grade titanium dioxide" as used herein is intended to mean and to refer to finely divided food grade titanium dioxide wherein the particles have an average particle size between about 0.28 and about 0.32 micron and a particle size distribution such that the preponderance of the particles have an ultimate size between 0.2 and 0.4 micron.

In the most preferred embodiment, the whitener is a finely divided food grade titanium dioxide, which can be purchased from Warner-Jenkinson under the trade name kowet titanium dioxide.

Generally, the coating contains the whitener in an amount from about 0.0001% to about 99% by weight of the coating. Preferably, the coating contains the whitener in an amount from about 0.0001% to about 10%, more preferably from about 0.001% to about 5% by weight of the coating.

The whitener will be present in the finished food product at a level from about 0.0001% to about 50% by weight of the finished food product. Preferably, the whitener will be present in the finished food product in an amount from about 0.0001% to about 10%, more preferably from about 0.001% to about 5% by weight of the finished food product.

In the most preferred embodiment, the edible base is a potato piece, the coating is a batter and the whitener is titanium dioxide. In this embodiment, the finished food product comprises from about 70% to about 99% by weight of an edible base, from about 1% to about 30% by weight of a batter, and from about 0.001% to about 0.5% by weight of titanium dioxide. More preferably, the finished food product contains from about 75% to about 95% by weight of an edible base, from about 5% to about 25% by weight of a batter, and from about 0.008% to about 0.1% by weight of titanium dioxide. A particularly preferred finished food product contains from about 80% to about 90% by weight of an edible base, from about 10% to about 20% by weight of a batter, and from about 0.01% to about 0.005% by weight of titanium dioxide. The percentages stated above refer to the amount of the ingredient in the finished product.

As noted above, the present invention also includes a process for preparing a whitened food product. Generally, the process includes applying a coating to an edible base wherein the coating contains a quantity of a whitener sufficient to impart a white color to the edible base when a sufficient amount of coating is applied. The edible base, coating, and whitener include all those particular ingredients described above.

The process may also include any suitable and known food processing steps prior to applying the coating. For example, the process may include one or more of the following steps: washing, cutting, blanching, drying, heating, cooling, wet or dry battering. Similarly, the process may also include any suitable and known food processing steps after applying the coating. For example, the process may include one or more of the following steps: drying, parfrying, freezing, reheating.

The coating may be applied in any manner known to those skilled in the art and may include, without being limited, dipping, spraying, dry mixing, enrobing, and the like. Of course, where the method of applying the coating includes dipping into an aqueous mixture, the process may also include a drying step.

A preferred embodiment of the process of the present invention includes preparing batter coated frozen partially cooked, or parfried potato pieces having a uniform light white color. The potato pieces maintain this light white color through the final preparation steps or reheating in a conventional or convection oven, microwave oven, or through deep fat frying.

The method provides a uniform light white tone to the potato product. The level of the light white tone can be increased to compensate for changes in inherent raw potato reducing sugar level, changes in the batter coating used, and changes in the process that would normally produce darker colored potato products than desired.

In this preferred process, the coating comprises an aqueous batter mix (described above) and the whitener may be added to the dry batter ingredients or to the water used to hydrate the dry batter ingredients. In the most preferred embodiment, the whitener is added to the dry batter ingredients. The potato pieces can then be passed through the aqueous batter mix.

Alternatively, the coating may be an aqueous solution containing a whitener. In this alternative, the coating may be applied to the potato pieces, before or after applying batter to the potato pieces, which may or may not contain the whitener. Various suitable combinations may likewise be used. For example, the batter may not contain a whitener and the coating containing the whitener may be applied to the potato piece before applying the batter, after applying the batter, or both.

The process produces potato pieces having a white, light color in the frozen parfried and prepared final fried forms. Final preparation for consumption of the pieces may be accomplished by, for example, reheating for a few minutes in an oven or deep fryer, or for 10–20 minutes as a conventional oven, or by microwaving.

Where other products are used, for example an edible base such as a bone-in chicken, cooking times will of course be different and may vary from 10 to 90 minutes or more depending on the cooking temperature.

One preferred process for making cooked potatoes will now be described. Raw potato pieces are prepared in a conventional manner for batter coating as is known to those skilled in the art. Typically, raw potatoes are washed, cut into desired potato shapes, and blanched in steam or hot water to inactivate enzymes. Optionally, the raw potatoes are peeled to remove the skin before cutting and blanching. The raw potato can also be preheated to an internal temperature of about 120° F. to about 150° F. before cutting to facilitate the cutting process. The blanched potatoes are then typically transferred from the blancher to a drier by use of a hot water flume. The whitener may be added to the flume water. In this instance, the flume water is considered to be the coating referred to above.

The potato pieces are then partially dehydrated in hot air to reduce their weight by up to 35%. A wet batter coating (containing starches, flavorings and other known conventional batter ingredients) is applied to the cut, blanched, and partially dehydrated potato pieces by conventional methods such as dipping. As noted above, the dry batter mix and/or the water used to prepare the wet batter may contain the whitener and, in this instance, will be considered to be the coating referred to above.

The wet batter generally consists of rehydrated flours, starches, and other binders and may contain spices, flavors, and other colors. The batter generally contains from about 35% to about 85% water by weight preferably from about 45% to about 70% and, more preferably from about 50% to about 65% water by weight when applied to the potato piece surface. This batter is typically applied to the potato at a level of from about 1% to about 90% of the weight preferably from about 5% to about 50%, more preferably from about 10% to about 40% of the final coated potato product.

After applying the wet batter coating, the coated potato piece is parfried in hot oil by conventional means to harden the wet batter onto the potato piece surface. The parfrying removes most of the water from the batter coating, allowing the product to be later frozen and packaged.

Following the wet batter coating and either before or after the parfrying step, a coating containing the whitener may be applied to the surface of the now batter coated potato piece. Where the coating is applied following the initial batter coating parfry step, an additional parfrying step is usually used to harden the coating onto the potato piece surface before the product is frozen and packaged.

Finally, the parfried potato pieces are packaged by conventional means for storage until final preparation and consumption. The frozen potato pieces are prepared for consumption by either finish frying, baking, or microwaving. After such final preparation, the batter coated potato pieces have not only a crisp outer shell, but more importantly, the outer appearance is more uniformly light white in color than would be possible without the use of the whitener.

In another more preferred aspect of the present invention, a dry batter containing a whitener is provided. The dry batter preferably contains those ingredients described above for use in applying a batter to a potato piece. As is well known, water can be added to form a liquid or aqueous batter. In this aspect, the batter contains from about 0.0001% to about 10% by weight of a whitener, more preferably, the batter contains from about 0.001% to about 5% by weight of a whitener. The whitener is preferably titanium dioxide, as described above.

The batter may be used to coat any suitable edible base described above. It is preferred, however, to apply such a batter to potato pieces.

The following examples illustrate, but do not limit, the present invention. Unless otherwise indicated, all parts and percentages are by weight.

EXAMPLE 1

To demonstrate the light white tone obtained by the addition of a whitener, french fry strips were prepared with and without the whitener added to a typical dry mix batter. Approximately 35 pounds of processor grade Russet potatoes were obtained from a commercial processor. Potatoes were peeled by hand and cut into ¼"×¼" french fry strips of about 2"–3½" long using a hand operated french fry cutter with a ¼" blade. Slivers and non-uniform cuts were discarded during the process.

The french fry strips were blanched in water having a temperature of about 180° F. for 6 minutes using a steam heated jacketed kettle and then drained. The drained strips were placed into a water bath (simulating a commercial flume operation) at about 150° F. for 40 seconds containing 0.5% sodium pyrophosphate (SAPP) and then drained.

The drained french fry strips were placed in a single layer on a perforated drying tray and dried for 10 minutes at a temperature between about 150°–185° F. in a continuous belt drier. The blanched and partially dried french fry strips were then divided into four batches.

Four identical dry mix batters were prepared with the amount of whitener added to each batter being varied according to Table I.

TABLE I

| Ingredient | A (wt %) | B (wt %) | C (wt %) | D (wt %) |
|---|---|---|---|---|
| Batter | 100 | 99.75 | 99.5 | 99.0 |
| Whitener (titanium dioxide) | 0 | 0.25 | 0.5 | 1.0 |

The dry batter was formed into an aqueous slurry by the addition of water. The aqueous slurry contained about 48.5% dry batter and about 51.5% water.

Each of the four batches of french fries strips were batter coated in the same manner using one of the batters in TABLE I above by passing the strips through a wet batter bath and an air blower to blow off the excess batter such that wet batter pickup was approximately 11% to 13%.

$$\text{\% Coated Final Product pickup} = \frac{(\text{Coated Base Product Weight}) - (\text{Uncoated Base Product Weight}) \times 100}{\text{Coated Base Product Weight}}$$

Each batch of batter coated french fry strips was placed into a fryer to parfry at a temperature of about 365° F. for 40 seconds before being placed into a blast freezer at a temperature of about –20° F. for a period of 45 minutes. Each of the four separate french fry portions were then placed into a commercial freezer at a temperature of about 0 to –10° F. for storage.

The Munsell color of each batch was measured after the parfrying and freezing step and after a typical finish frying procedure for consumption. The finish frying procedure used was to cook 0.5 pound of the frozen product at 360° F. for about 2.75 minutes. The USDA Munsell color chart has long been used in the french fry industry to identify darkness of french fries. The Munsell color scale runs from very light color at a Munsell #000 to very dark color at a Munsell #4. It is desired to have a finished fried Munsell color of from between Munsell #0 to Munsell #2. A 0.25–0.50 difference in Munsell color is considered significant in the french fry industry.

Table II presents the results. The use of a whitener significantly reduced the darkening effect of the processing. One of skill in the art will appreciate that the finished french fry color can be varied by varying the amount of whitener.

TABLE II

| Batter Mix | Parfry (Munsell #) | Finished Fry (Munsell #) |
|---|---|---|
| A (Control) | 1.25 | 1.75–2.0 |
| B | 00–0 | 0.50 |
| C | 000–00 | 0.25 |
| D | <000 | 00–0 |

Although it is contemplated that the desired finished product color can be obtained by incorporating the whitener (i.e. titanium dioxide) at any step of the process, it has been found that the addition of titanium dioxide to the water to hydrate the batter, and to the flume water, at levels less than 1% did not produce the desired finished product color.

While the present invention has been described primarily in terms of potato pieces, as noted above, it should be apparent to those of skill in the art that the present invention may find use for preparing food products using edible foods other than potatoes. It will also be apparent that various modifications and changes can be made both in the processing and in the relative amounts of the preferred ingredients to prepare food products without departing form the scope of the invention set forth in the claims. All such modifications or changes coming within the terms of the claims are intended to be included in the claims.

What is claimed is:

1. A food product comprising:
   a. an edible base; and
   b. an edible coating surrounding the base and containing an edible amount of a whitener in an amount from about 0.0001% to about 1% by weight of the food product, the whitener being present in an amount sufficient to impart a white color to the base.

2. The food product of claim 1 wherein the whitener is selected from the group consisting of titanium dioxide, white dye, and mixtures thereof.

3. The food product of claim 2 wherein the whitener is titanium dioxide and is selected from the group consisting of finely divided food grade titanium dioxide, pigmentary food grade titanium dioxide and mixtures thereof.

4. The food product of claim 1 wherein the edible base is a potato.

5. The food product of claim 1 wherein the edible base is a chicken.

6. The product of claim 1 containing an amount of coating from about 1% to about 90% by weight of the finished food product.

7. The product of claim 1 containing an amount of coating from about 4% to about 70% by weight of the finished food product.

8. The product of claim 1 containing an amount of coating from about 10% to about 60% by weight of the finished food product.

9. A process for preparing a food product comprising:

applying an edible coating to an edible base wherein the coating contains an edible amount of a whitener in an amount from about 0.0001% to about 1.0% by weight of the food product, the whitener being present in an amount sufficient to impart a white color to the base.

10. The process of claim 9 wherein the whitener is selected from the group consisting of titanium dioxide, white dye, and mixtures thereof.

11. The process of claim 10 wherein the whitener is titanium dioxide and is selected from the group consisting of finely divided food grade titanium dioxide, pigmentary food grade titanium dioxide and mixtures thereof.

12. The process of claim 11 wherein the titanium dioxide is present in an amount from about 0.0001% to about 1% by weight of the food product.

13. The process of claim 12 wherein the edible base is a potato.

14. The process of claim 9 further comprising washing the base before applying the coating.

15. The process of claim 9 further comprising cutting the base before applying the coating.

16. The process of claim 9 further comprising blanching the base before applying the coating.

17. The process of claim 9 further comprising drying the coated base.

18. The process of claim 9 further comprising parfrying the coated base.

19. The process of claim 18 further comprising freezing the parfried coated base.

20. The process of claim 19 further comprising reheating the frozen parfried coated base.

21. The process of claim 9 wherein the coating is an aqueous solution.

22. The process of claim 9 wherein the coating is a powder.

23. The process of claim 9 wherein the step of applying the coating is selected from the group consisting of dipping, spraying, dry mixing, enrobing, and mixtures thereof.

* * * * *